United States Patent
Baek et al.

(10) Patent No.: US 10,484,600 B2
(45) Date of Patent: Nov. 19, 2019

(54) ELECTRONIC APPARATUS AND CONTROLLING METHOD THEREOF

(71) Applicant: Samsung Electronics Co., Ltd., Suwon-si, Gyeonggi-do (KR)

(72) Inventors: Jae Myung Baek, Hwaseong-si (KR); Young Kwon Yoon, Seoul (KR); Taek Seong Jeong, Suwon-si (KR); Subash Pandey, Suwon-si (KR); Sang Kee Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/696,504

(22) Filed: Sep. 6, 2017

(65) Prior Publication Data
US 2018/0070009 A1 Mar. 8, 2018

(30) Foreign Application Priority Data
Sep. 7, 2016 (KR) .......................... 10-2016-0115309

(51) Int. Cl.
| | |
|---|---|
| H04N 5/232 | (2006.01) |
| H04N 5/247 | (2006.01) |
| H04N 5/04 | (2006.01) |
| H04N 5/235 | (2006.01) |
| H04N 5/225 | (2006.01) |
| H04N 13/239 | (2018.01) |
| H04N 13/00 | (2018.01) |

(52) U.S. Cl.
CPC ........... *H04N 5/23232* (2013.01); *H04N 5/04* (2013.01); *H04N 5/2258* (2013.01); *H04N 5/2351* (2013.01); *H04N 5/2353* (2013.01); *H04N 5/23216* (2013.01); *H04N 5/23241* (2013.01); *H04N 5/23296* (2013.01); *H04N 5/247* (2013.01); *H04N 13/239* (2018.05); *H04N 5/23293* (2013.01); *H04N 2013/0081* (2013.01)

(58) Field of Classification Search
None
See application file for complete search history.

(56) References Cited

U.S. PATENT DOCUMENTS 9,185,291 B1 * 11/2015 Shabtay ............... H04N 5/2258
9,438,868 B2 9/2016 Boettiger
(Continued)

FOREIGN PATENT DOCUMENTS

| EP | 2 860 963 A1 | 4/2015 |
| EP | 2 874 386 A1 | 5/2015 |

*Primary Examiner* — James M Hannett
(74) *Attorney, Agent, or Firm* — Jefferson IP Law, LLP

(57) ABSTRACT

An electronic apparatus and a method thereof are provided. The electronic apparatus includes a first camera including a first angle of view, a second camera including a second angle of view, a display, an input device for obtaining a set ratio, and a processor. If the ratio is within a specified range, the processor sets the first camera to a specified first frame rate, and the second camera to a second frame rate slower than the first frame rate, and displays a first image, which is obtained at the first frame rate using the first camera. If the ratio is within other specified range, the processor sets the second camera to a specified third frame rate, the first camera to a fourth frame rate slower than the third frame rate, and displays a second image, which is obtained at the third frame rate using the second camera.

19 Claims, 10 Drawing Sheets

(56) References Cited

U.S. PATENT DOCUMENTS

| | | |
|---|---|---|
| 9,583,133 B2 | 2/2017 | Hirata et al. |
| 9,661,233 B2 | 5/2017 | Shabtay et al. |
| 2008/0211941 A1* | 9/2008 | Deever ............... H04N 5/2258 |
| | | 348/262 |
| 2015/0138406 A1 | 5/2015 | Sokeila et al. |
| 2015/0162048 A1* | 6/2015 | Hirata ................ H04N 5/2258 |
| | | 386/337 |
| 2015/0229889 A1 | 8/2015 | Boettiger |
| 2016/0007008 A1 | 1/2016 | Molgaard et al. |
| 2016/0050374 A1 | 2/2016 | Shabtay et al. |
| 2016/0241793 A1* | 8/2016 | Ravirala ............... H04N 5/247 |
| 2017/0150061 A1 | 5/2017 | Shabtay et al. |

\* cited by examiner

ELECTRONIC APPARATUS AND CONTROLLING METHOD THEREOF

CROSS-REFERENCE TO RELATED APPLICATION(S)

This application claims the benefit under 35 U.S.C. § 119(a) of a Korean patent application filed on Sep. 7, 2016 in the Korean Intellectual Property Office and assigned Serial number 10-2016-0115309, the entire disclosure of which is hereby incorporated by reference.

TECHNICAL FIELD

The present disclosure relates to an electronic apparatus equipped with a plurality of cameras, and a controlling method thereof.

BACKGROUND

Recently, a plurality of camera modules has been applied to an electronic apparatus. For example, the plurality of camera modules may be mounted on different surfaces of the electronic apparatus and may be used to capture images in different directions. Alternatively, the plurality of camera modules may be mounted on the same surface of the electronic apparatus and may be used when the electric apparatus provides an image (e.g., a three-dimensional (3D) image) obtained by composing images captured in the same direction.

The electronic apparatus using a dual camera may cause a user to feel awkwardness due to parallax, a difference in color and brightness between two camera modules.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus capable of reducing power consumption of a dual camera module and a controlling method thereof.

In accordance with an aspect of the present disclosure, an electronic apparatus is provided. The electronic apparatus includes a first camera including a first angle of view, a second camera including a second angle of view, a display, an input device that obtains a set ratio based on a user input, and at least one processor. The at least one processor is configured, if the ratio is within a specified range, to set the first camera to a specified first frame rate, to set the second camera to a second frame rate, which is slower than the first frame rate, and to display a first image, which is obtained at the first frame rate by using the first camera, through the display. The at least one processor is further configured, if the ratio is within other specified range, to set the second camera to a specified third frame rate, to set the first camera to a fourth frame rate, which is slower than the third frame rate, and to display a second image, which is obtained at the third frame rate by using the second camera, through the display.

In accordance with another aspect of the present disclosure, a method of controlling, by at least one processor, an electronic apparatus including a first camera having a first angle of view and a second camera having a second angle of view. The method includes receiving a ratio, which is set by user intention, through an input device, if the ratio is within a specified range, setting the first camera to a specified first frame rate, setting the second camera to a second frame rate, which is slower than the first frame rate, and displaying a first image, which is obtained at the first frame rate by using the first camera, through a display, and if the ratio is within other specified range, setting the second camera to a specified third frame rate, setting the first camera to a fourth frame rate, which is slower than the third frame rate, and displaying a second image, which is obtained at the third frame rate by using the second camera, through the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
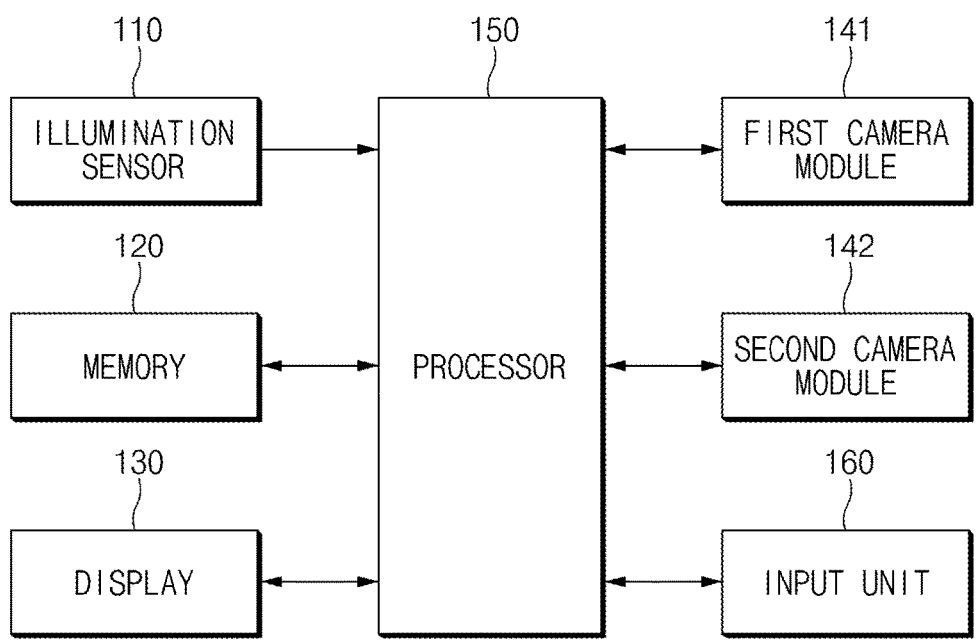
FIG. 1 is a block diagram illustrating an electronic apparatus, according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, medical devices, cameras, or wearable devices such as an accessory type including a timepiece, a ring, a bracelet, an anklet, a necklace, glasses, a contact lens, or a head-mounted-device (HMD), one-piece fabric or clothes type of a device, such as electronic clothes, a body-attached type of a device, such as a skin pad or a tattoo, or a bio-implantable circuit.

According to embodiments, the electronic device may include at least one of televisions (TVs), digital versatile disc (DVD) players, audios, refrigerators, air conditioners, cleaners, ovens, microwave ovens, washing machines, air cleaners, set-top boxes, home automation control panels, security control panels, media boxes, such as Samsung HomeSync™, Apple TV™, or Google TV™), game consoles, such as Xbox™ or PlayStation™, electronic dictionaries, electronic keys, camcorders, electronic picture frames, and the like.

According to another embodiment, the electronic device may include at least one of various portable medical measurement devices, such as a blood glucose monitoring device, a heartbeat measuring device, a blood pressure measuring device, and a body temperature measuring device, a magnetic resonance angiography (MRA) device, a magnetic resonance imaging (MRI) device, a computed tomography (CT) device, scanners, and ultrasonic devices, navigation devices, global navigation satellite systems (GNSSs), event data recorders (EDRs), flight data recorders (FDRs), vehicle infotainment devices, electronic equipment for vessels, such as navigation systems and gyrocompasses, avionics, security devices, head units for vehicles, industrial or home robots, drones, automated teller machines (ATMs), points of sales (POSs) devices, or Internet of Things (IoT) devices, such as light bulbs, various sensors, sprinkler devices, fire alarms, thermostats, street lamps, toasters, exercise equipment, hot water tanks, heaters, and boilers.

According to an embodiment, the electronic devices may include at least one of parts of furniture, buildings/structures or vehicles, electronic boards, electronic signature receiving devices, projectors, or various measuring instruments, such as water meters, electricity meters, gas meters, or wave meters.

According to embodiments, the electronic device may be a flexible electronic device or a combination of two or more of devices among the above-described devices, but may not be limited to the above-described electronic devices. The term "user" used herein may refer to a person who uses an electronic device or to an artificial intelligence electronic device that uses an electronic device.

FIG. 1 is a block diagram illustrating an electronic apparatus, according to an embodiment of the present disclosure.

Referring to FIG. 1, an electronic apparatus 10 according to an embodiment of the present disclosure may include first and second camera modules 141 and 142, a memory 120, an input unit 160 (e.g., an input device), a display 130, an illumination sensor 110, and at least one processor 150.

According to an embodiment of the present disclosure, the first camera module 141 may include a first lens group, which has a first focus length and a first angle of view, and a first image sensor that is disposed under the first lens group and captures an image. For example, the first lens group may be a wide-angle lens.

According to an embodiment of the present disclosure, the second camera module 142 may include a second lens group, which has a second focus length exceeding the first focus length and a second angle of view smaller than the first angle of view, and a second image sensor that is disposed under the second lens group and captures an image. For example, the second lens group may be a telephoto lens.

According to an embodiment of the present disclosure, in a preview mode, one of the first and second camera modules 141 and 142 may operate as a master providing a preview image, and the other may operate as a slave not providing the preview image. The slave of the first and second camera modules 141 and 142 may receive a synchronization signal Vsync of the master and may synchronize a frame rate with the synchronization signal (time sync). The slave may receive auto exposure (AE) information and auto white balance (AWB) information of the master and may adjust AE and AWB by using the AE information and the AWB information of the master. As a result, according to an embodiment of the present disclosure, a variation in color, brightness, or the like between first and second images may be slightly corrected depending on performing a zoom function. According to an embodiment of the present disclosure, the AE, the AWB, and auto focus (AF) may be performed by the processor 150.

The memory 120 may be a volatile memory (e.g., a random access memory (RAM) or the like), a nonvolatile memory (e.g., a read only memory (ROM), a flash memory, or the like), or a combination thereof. For example, the memory 120 may store instructions or data associated with at least one other component(s) of the electronic apparatus 10. According to an embodiment of the present disclosure, the memory 120 may store information needed to control a dual camera. For example, the memory 120 may store a frame rate for each sensed illumination, a ratio of a first frame rate to a second frame rate, first and second critical ratios, marginal illumination, critical illumination, and the like.

According to an embodiment of the present disclosure, the illumination sensor 110 may sense ambient illumination of the first and second camera modules 141 and 142. For example, the illumination sensor 110 may be mounted adjacent to the first and second camera modules 141 and 142 and may sense ambient illumination. The illumination sensor 110 may be omitted. For example, the illumination sensor 110 may be included in at least one of the first and second camera modules 141 and 142 and an image sensor may be used as the illumination sensor 110.

According to an embodiment of the present disclosure, the input unit 160 may receive or sense a user input. For example, the input unit 160 may include at least one of a touch sensor (a touch screen) and a button that are included on the display 130. According to an embodiment, the input unit 160 may obtain a set ratio based on the user input.

The display 130 may include, for example, a liquid crystal display (LCD), a light-emitting diode (LED) display, an organic LED (OLED) display, or an electronic paper display. The display 130 may display, for example, various kinds of content (e.g., a text, an image, a video, an icon, and/or a symbol) to a user. According to an embodiment of the present disclosure, the display 130 may output an image, for example, a preview image or a capture image, which is received from at least one of the first and second camera modules 141 and 142, under control of the processor 150. The display 130 may display a user interface or the like under control of the processor 150. For example, the user interface may be a screen for selecting a command of a zoom adjusting function, a preview mode, capture, or the like.

For example, the processor 150 may include at least one a central processing unit (CPU), a graphic processing unit (GPU), a microprocessor, an application processor (AP), an application specific integrated circuit (ASIC), a field programmable gate arrays (FPGA) and may have a plurality of cores. The processor 150 may perform data processing or an operation associated with control and/or communication of at least one other element(s) of the electronic apparatus 10.

According to an embodiment of the present disclosure, the processor 150 may perform overall control on the first and second camera modules 141 and 142. For example, the processor 150 may control driving (on), a driving mode (e.g., sleep, standby, active, or the like), a frame rate, digital zoom, or the like of each of the first and second camera modules 141 and 142.

According to an embodiment of the present disclosure, the processor 150 may generate a preview image by using a first image from the first camera module 141 before adjusting a zoom ratio in a preview mode. For example, if entering the preview mode, the processor 150 may drive the first and second camera modules 141 and 142 and may allow the second camera module 142 to enter a sleep (or a standby) mode after a specific time period. The processor 150 may set up a frame rate of the first camera module 141 to a first frame rate. For example, the first frame rate may be the highest frame rate (e.g., 30 fps) on a preview (or a live view) and may be changed depending on the ambient illumination such that the first frame rate is less than the highest frame rate. According to an embodiment, the processor 150 may set up a frame rate of the second camera module 142, which is a slave, to a second frame rate, not controlling the second camera module 142 to be in the sleep mode or the standby mode. For example, the second frame rate may be less than the first frame rate and may be, for example, 5 fps.

According to an embodiment of the present disclosure, the processor 150 may obtain depth information by using parallax between the first camera module 141 and the second camera module 142. The processor 150 may verify depth information about an external object (e.g., a subject) based on the depth information obtained by using the first and second camera modules 141 and 142.

According to an embodiment of the present disclosure, after aligning the first and second images, which are respectively generated by using the first and second camera modules 141 and 142, based on a calibration value of each of the first and second camera modules 141 and 142, the processor 150 may search for a pixel of the first image, which is matched to the pixel of the second image while a pixel of the second image is shifted, to generate a depth map. According to an embodiment, the processor 150 may map a shift amount, which is needed to search for the pixel of the first image matched to each of pixels of the second image, to the depth information to generate the depth map. The processor 150 may express a pixel, the shift amount of which is small, as a short-distance pixel in the depth map, and may express a pixel, the shift amount of which is great, as a long-distance pixel in the depth map. According to an embodiment, the calibration value may be determined through a calibration process when the first and second camera modules 141 and 142 are manufactured, and may be, for example, an intrinsic parameter or an extrinsic parameter. The intrinsic parameter may be a characteristic of each of camera modules, and may be an optical center, a focal length, lens distortion, or the like. The extrinsic parameter may indicate a relative location between two camera modules, and may be tilt or shift. The calibration value may be stored in an internal memory (e.g., ROM) of each of the first and second camera modules 141 and 142.

According to an embodiment of the present disclosure, the processor 150 may decrease a resolution of each of the first and second images (e.g., video graphics array (VGA) ~high definition (HD)) to generate the depth map. Afterwards, after adjusting the resolution of the depth map as a resolution needed depending on an application program, the processor 150 may output the adjusted depth map. The processor 150 may generate an out-focused scene by adjusting a blur amount in at least one of the first and second images by using the depth map depending on a distance from a subject. According to an embodiment of the present disclosure, the processor 150 may generate a preview image by using the second image, which is captured by using the second camera module 142, and may output the preview image to the display 130. The processor 150 may generate the depth map in a scene corresponding to the preview image. In this case, the processor 150 may generate the depth map by using the first image and the second image. The processor 150 may apply out-focusing effect to an image corresponding to the preview image by using the depth map. As a result, according to an embodiment of the present disclosure, the parallax between the first and second images may be corrected depending on performing the zoom function.

According to an embodiment of the present disclosure, if the zoom adjusting function is selected in the preview mode, the processor 150 may change and set a camera module (a master), which provides the preview image, from among the first and second camera modules 141 and 142 depending on a set zoom ratio. The processor 150 may verify the selection of the zoom adjusting function by using a two-finger touch on the display 130 displaying the preview image, through the input unit 160. For example, in the preview mode, if the set zoom ratio is less than a first critical ratio (e.g., two times), the processor 150 may maintain the first camera module 141 as the master. For another example, if the set zoom ratio is not less than the first critical ratio, the processor 150 may change and set a camera module (master) providing the preview image from the first camera module 141 to the second camera module 142.

According to an embodiment of the present disclosure, the processor 150 may direct the first and second camera modules 141 and 142 to perform AF that is based on a specified center. According to another embodiment, when the zoom adjusting function is selected in the preview mode, the processor 150 may provide the second camera module 142 with specified center information and may direct the second camera module 142 to perform the AF that is based on the center. In this case, the frame rate of the second camera module 142 may be changed into the first frame rate and may perform an AF function. The processor 150 may direct the second camera module 142 to change a frame rate for performing the AF. According to an embodiment, the set center may be a center of a capture image of each of the camera modules 141 and 142. Alternatively, the set center may be a center of a zoom scene selected by the user.

According to an embodiment of the present disclosure, in the preview mode, the processor 150 may control the frame rates of the master and the slave in multiple relation. For example, the processor 150 may control the frame rates of the master by multiples of the frame rates of the slave. For another example, if the first camera module 141 is the master, the processor 150 may set up the frame rate of the first camera module 141 to 30 fps, and may set up the frame rate of the second camera module 142 being the slave to 5 fps (=30 fps/n, 'n' is a natural number).

According to an embodiment of the present disclosure, the processor 150 may set a second frame rate to vary depending on a camera module, which is set to the slave, from among the first and second camera modules 141 and 142. For example, in the case where the first camera module 141 is the slave, the processor 150 may set the second frame rate to 10 fps. In the case where the second camera module 142 is the slave, the processor 150 may set the second frame rate to 5 fps. As such, according to an embodiment of the present disclosure, when the first camera module 141, AF processing speed of which is relatively fast, is the slave, the AF function may be performed without the change of the frame rate.

According to an embodiment of the present disclosure, for example, the processor 150 may adjust the frame rate of the master depending on the ambient illumination sensed by the illumination sensor 110 in the preview mode for capturing a still image. In this case, the processor 150 may adjust the frame rate of a slave camera module so as to correspond to the frame rate of a master camera module. For example, in the case where the first camera module 141 is the master, the processor 150 may set up the frame rate of the first camera module 141 to 30 to 10 fps depending on the ambient illumination, as illustrated in a first column of Table 1. In the case where the first camera module 141 is the master, the processor 150 may adjust the frame rate of the second camera module 142 to a frame rate of 5 to 7.5 fps as illustrated in a second column of Table 1 based on the frame rate ratio (fps ratio) designated depending on the ambient illumination. For example, as illustrated in a third column of Table 1, the processor 150 may control the frame rates of the master and the slave in specified multiple relation.

TABLE 1

| W [fps] | T [fps] | fps ratio |
|---|---|---|
| 30 | 5 | 6:1 |
| 30~25 | 6~5 | 5:1 |
| 25~20 | 6.25~5 | 4:1 |
| 20~15 | 6.7~5 | 3:1 |
| 15~10 | 7.5~5 | 2:1 |

For example, in the case where the second camera module 142 is the master, the processor 150 may set up the frame rate of the second camera module 142 to 30 to 10 fps depending on the ambient illumination as illustrated in Table 2, and may adjust the frame rate of the slave, which is the first camera module 141, to a specified frame rate of 10 to 20 fps. For example, as illustrated in a third column of Table 2, the processor 150 may control the frame rates of the master and the slave in specified multiple relation.

TABLE 2

| T [fps] | W [fps] | fps ratio |
|---|---|---|
| 30 | 10 | 3:1 |
| 30~25 | 15~10 | 2~2.5:1 |
| 25~20 | 20~10 | 1:1 |

According to an embodiment of the present disclosure, if illumination is less than critical illumination, the processor 150 may variably set the frame rate of the master of the first and second camera modules 141 and 142 depending on the sensed illumination, but the processor 150 may not adjust the frame rate of the slave. According to an embodiment, the critical illumination may be illumination in which a resolution of an image captured at the first frame rate (the highest frame rate) by the first and second camera modules 141 and 142 decreases and may be experimentally determined.

According to an embodiment of the present disclosure, the processor 150 may control the slave of the first and second camera modules 141 and 142 in a time async state with the master depending on an illumination change to enter. For example, in the case where the frame rate of the master is set to be less than the highest frame rate, the processor 150 may not control the frame rates of the slave and the master in multiple relation. For example, in the case where the first camera module 141 is the master and the second camera module 142 is the slave, in the case where the frame rate of the master may be set to 27 fps, and in the case where the frame rate of the slave may be set to 5 fps, the master and the slave may be controlled in the time async state. If a capture command is verified through the input unit 160, the processor 150 may interrupt a frame of the slave and may newly start the frame of the slave in synchronization with the frame of the master. As a result, the processor 150 may generate a capture image in a state where the frames of the master and the slave are synchronized with each other. In this case, the newly started frame rate of the slave may be the same as the frame rate of the master, or the slave may operate at the specified second frame rate.

According to an embodiment of the present disclosure, in the preview mode for video recording, the processor 150 may not perform frame rate control regardless of the ambient illumination. For example, in the preview mode for video recording, the processor 150 may not change the first frame rate regardless of the ambient illumination.

According to an embodiment of the present disclosure, when changing the frame rate of the second camera module 142 from the second frame rate to the first frame rate, the processor 150 may set the frame rate of the second camera module 142 again after stopping the second camera module 142. For example, after directing the second camera module 142 to stream off, the processor 150 may adjust the frame rate of the second camera module 142 to the first frame rate, and then, the processor 150 may direct the second camera module 142 to stream on in synchronization with the frame rate of the first camera module 141. As such, according to an embodiment of the present disclosure, the speed at which a frame rate is changed may be improved.

According to an embodiment of the present disclosure, in the case where the processor 150 does not transmit at least one command of capture and a zoom ratio change in a state where both the first and second camera modules 141 and 142 operate at the first frame rate during a set critical time period (e.g., 5 seconds) or more (e.g., when a zoom adjusting function is selected), the processor 150 may change the frame rate of the slave into the second frame rate.

According to an embodiment of the present disclosure, in the preview mode, the processor 150 may periodically direct at least one of the first and second camera modules 141 and 142 to perform the AF. In addition, in the case where the zoom adjusting function is selected in the preview mode, the processor 150 may direct at least one of the first and second camera modules 141 and 142 to perform the AF by using center information of a scene selected through the input unit 160. For another example, in the case where the zoom adjusting function is selected, the processor 150 may direct the slave to perform the AF.

According to an embodiment of the present disclosure, if receiving the command of the AF performance, each of the first and second camera modules 141 and 142 may perform the AF. In the case where each of the first and second camera modules 141 and 142 receives center information of the selected scene, each of the first and second camera modules 141 and 142 may perform the AF with respect to a center that is based on the center information. According to an embodiment, if receiving an AF command while operating at the second frame rate, the second camera module 142 may change the frame rate into the first frame rate, and then the second camera module 142 may perform the AF. When operating as the slave, the first camera module 141 may perform the AF, not changing the frame rate even though verifying the AF command.

According to an embodiment of the present disclosure, the master of the first and second camera modules 141 and 142 may perform at least one of the AE or the AWB and may provide the slave with at least one of AE information or AWB information through the processor 150. According to an embodiment, the slave may perform the AE based on the AE information of the master and may perform the AWB based on the AWB information of the master.

According to an embodiment of the present disclosure, if a zoom ratio, which was not less than a first critical ratio, is adjusted to a ratio less than the first critical ratio, the processor 150 may first set the first camera module 141 to the master, and then may adjust the frame rate of the first camera module 141 to the first frame rate. For example, the zoom ratio of the first camera module 141 is adjusted by zoom-out to be less than the first critical ratio, the processor 150 may direct the first camera module 141 to change the frame rate of the first camera module 141 into the first frame rate while outputting a preview image by using an image that is received from the first camera module 141. The processor 150 may direct the second camera module 142 to change the frame rate of the second camera module 142 into the second frame rate.

According to an embodiment of the present disclosure, if the zoom ratio adjusted by the zoom adjusting function is within a specified ratio section (e.g., 1.7~2.3 times), the processor 150 may set up the frame rate of each of the first camera module 141 and the second camera module 142 to the first frame rate. For example, when zoom-in occurs at a point in time when the zoom ratio is less than the first critical ratio (e.g., two times), the processor 150 may set up the frame rate of each of the first and second camera modules 141 and 142 to the first frame rate in a section in which the zoom ratio is from 1.7 to 2 times. For another example, when zoom-out occurs at a point in time when the zoom ratio is not less than the first critical ratio (e.g., two times), the processor 150 may set up the frame rate of each of the first and second camera modules 141 and 142 to the first frame rate in a section in which the zoom ratio is from 2.3 times to 2 times. As a result, when the adjusted zoom ratio is changed to be greater than or equal to the first critical ratio or to be less than the first critical ratio, time delay of a change of the master and the slave may be reduced.

According to an embodiment of the present disclosure, if a request for at least one of capture, the AF, and a change of a zoom ratio is not received when both the first and second camera modules 141 and 142 operate at the first frame rate, the processor 150 may change a frame rate of a slave camera module, which is not in charge of a preview, to the second frame rate.

According to an embodiment of the present disclosure, even though generating a capture image in response to a capture command, the processor 150 may generate the capture image by using an image, which is received from at least one of the first camera module 141 and the second camera module 142, depending on the zoom ratio.

According to an embodiment, if the zoom ratio is less than a second critical ratio (e.g., 1.3 times), the processor 150 may generate the capture image by using the image captured by the first camera module 141. For example, the processor 150 may scale up an image from the first camera module 141 by using a digital zoom adjusting function of the first camera module 141 to generate the capture image.

According to another embodiment, if the zoom ratio is not less than the second critical ratio and is less than the first critical ratio (e.g., two times), the processor 150 may generate the capture image by composing images from the first and second camera modules 141 and 142. When the zoom ratio is not less than the second critical ratio and is less than the first critical ratio, the processor 150 may synchronize the frame rates of the first and second camera modules 141 and 142 with each other (time sync) to compose images from the first and second camera modules 141 and 142. The processor 150 may generate an image of the specified zoom ratio by composing images of the first and second camera modules 141 and 142. For example, the processor 150 may generate first and second images, which are captured by the first and second camera modules 141 and 142. The processor 150 may crop the first and second images to be suitable for the zoom ratio, and then the processor 150 may compose two cropped images. The processor 150 may tilt and shift the second image based on the calibration value of the second camera module 142. The processor 150 may detect where a scene, which is to be used, of the second image is in the first image, by dividing the second image into a plurality of blocks. In addition, the processor 150 may compose the second image and the detected scene of the first image. In embodiments of the present disclosure, as the distance from the subject becomes shorter, parallax between the first and second camera modules 141 and 142 may be greater. As the distance from the subject becomes longer, the parallax between the first and second camera modules 141 and 142 may be smaller. An image composing unit 157 may detect a scene of the first image corresponding to the scene, which is to be used, of the second image to compose the first and second images every capturing process by overcoming the parallax between the first and second images.

In another embodiment, if the set zoom ratio is not less than the first critical ratio, the processor 150 may generate the capture image by using the second image from the second camera module 142. For example, the processor 150 may enlarge the second image depending on the zoom ratio of the first critical ratio or higher by the digital zoom adjusting function of the second camera module 142 to generate the capture image. According to an embodiment of the present disclosure, when generating the capture image by using at least one of the first and second images, the processor 150 may perform noise reduction, contrast enhancement and/or super resolution (SR) zoom on at least one of the first and second images.

According to an embodiment of the present disclosure, the processor 150 may generate one capture image by using a plurality of image frames captured by the first and second camera modules 141 and 142. For example, the plurality of image frames may be different from each other depending on an environment, for example, a hand shake, at a point in time when being captured. As such, when the SR zoom is performed by using a plurality of frames (e.g., four), the processor 150 may improve a resolution of the capture image. For example, the processor 150 may generate a plurality of image frames by capturing an image by using at least one of the first and second camera modules 141 and 142 with exposure short than normal exposure and may generate the composed image (the capture image) by using the plurality of image frames. As such, according to an embodiment of the present disclosure, the capture image, the shake of which is small and a noise of which is reduced may be generated. For example, as the zoom ratio increases when the zoom ratio is 2 times or higher, the resolution of the capture image using the second camera module 142 may be reduced. When performing SR composition by composing a plurality of frames of the capture image using the second camera module 142, the processor 150 may improve the resolution of the capture image. Alternatively, when the zoom ratio is less than two times, the resolution of the capture image using the first camera module 141 may be lower than the resolution of the capture image using the second camera module 142. As such, in the image obtained by composing the first and second camera modules 141 and 142, a resolution of a boundary scene that is out of an image range of the second camera module 142 may be lower than a resolution of a center scene of the image range of the second camera module 142. To solve this issue, after improving the resolution of the capture image of the first camera module 141 by composing a plurality of frames of the capture image using the first camera module 141, the processor 150 may compose an image, the resolution of which is improved, and the capture image using the second camera module 142 so as to correspond to the set zoom ratio.

According to various embodiments of the present disclosure, the power consumption may be reduced by reducing the frame rate of a camera module, which does not provide a preview image, from among two camera modules, excluding the case where the camera module that does not provide a preview image is needed.

According to various embodiments of the present disclosure, a time required to perform AE/AWB may be reduced by performing AE/AWB of a slave camera module by using AE/AWB information of a master camera module providing a preview image.

Figure 2:
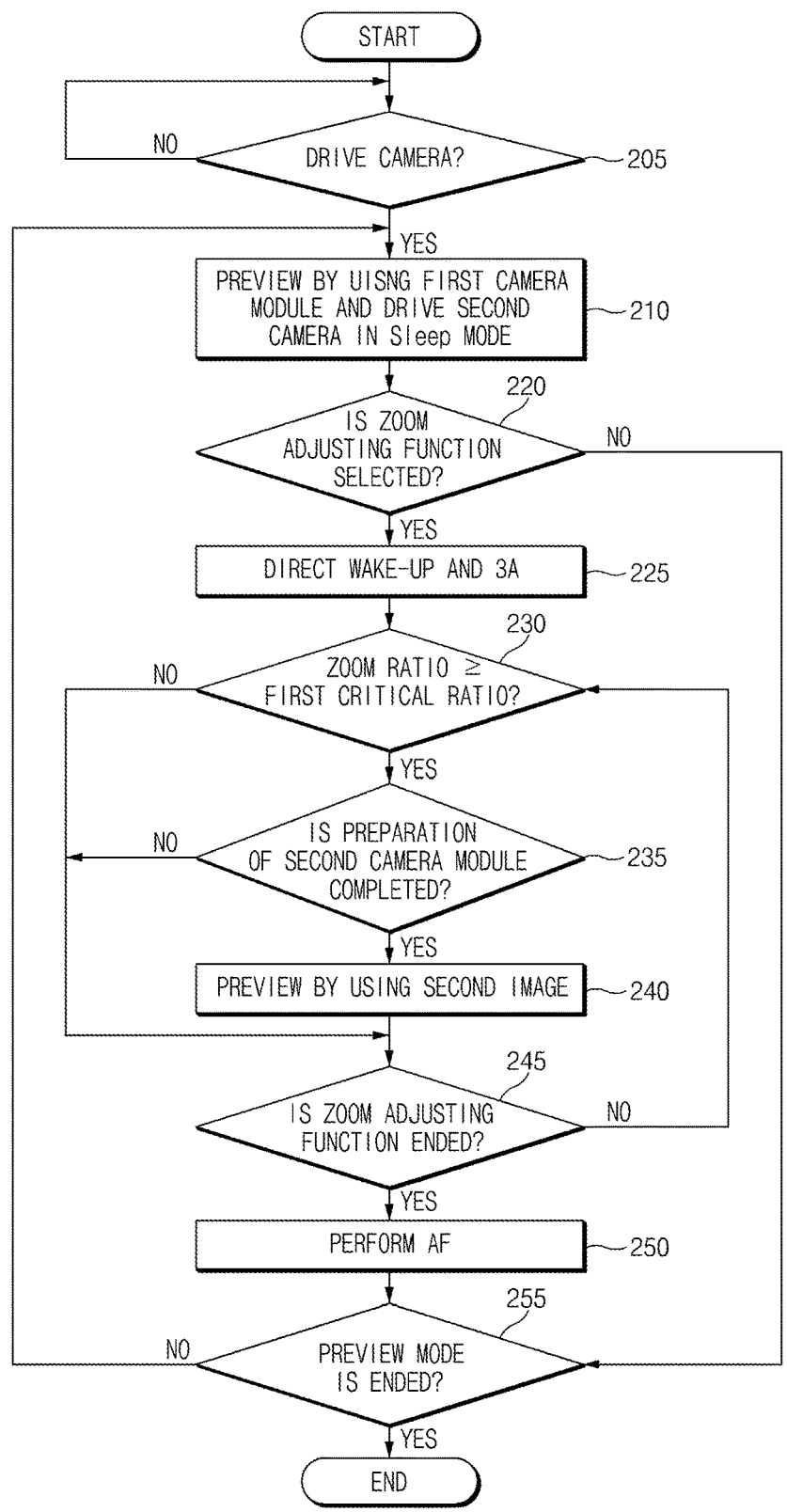
FIG. 2 is a flowchart illustrating a camera driving method, according to a first embodiment of the present disclosure.

FIG. 2 is a flowchart illustrating a camera driving method, according to a first embodiment of the present disclosure.

Referring to FIG. 2, in operation 205, if entering a preview mode, the processor 150 may drive the first and second camera modules 141 and 142.

In operation 210, the processor 150 may determine whether initialization of the first camera module 141 is completed. If the initialization of the first camera module 141 is completed, the processor 150 may perform a preview by using a first image from the first camera module 141. If the initialization of the second camera module 142 is completed, the processor 150 may drive the second camera module 142 in a sleep (or a standby) mode.

In operation 220, the processor 150 may determine whether a zoom adjusting function is selected by a user. For example, when sensing a two-finger touch on a preview screen, the processor 150 may verify the selection of the zoom adjusting function.

If the zoom adjusting function verified in operation 220 is selected, in operation 225, the processor 150 may direct the second camera module 142 to perform wake-up and AE, AWB, and AF functions. For example, if the second camera module 142 is in a sleep (or a standby) mode, the processor 150 may direct the second camera module 142 to wake up and operate at a first frame rate, and then the processor 150 may direct the second camera module 142 to perform the AE, AWB, and AF functions. In operation 225, the first camera module 141 may output a synchronization (e.g., Vsync) signal at every frame starting point. The second camera module 142 may output a second image in synchronization with the synchronization signal of the first camera module 141. In operation 225, the processor 150 may perform the AWB and the AE on the second image, which is received from the second camera module 142, by using AWB information and AE information of the first image from the first camera module 141. In operation 225, the processor 150 may perform phase difference AF (phase detection) or contrast AF (coarse AF). For example, in the case where a time required for AF takes a longer since information of the phase difference AF is inaccurate due to low-illumination or the like, the processor 150 may end the AF function prematurely at a location that is not an optimal focus. In the case where a first critical time period expires after transmitting the AF command, the processor 150 may end the AF function of the second camera module 142 and may perform the contrast AF.

In operation 230, when a zoom ratio is changed through the input unit 160, the processor 150 may determine whether the set zoom ratio is not less than the first critical ratio.

In operation 235, if the zoom ratio is not less than the first critical ratio (e.g., two times), the processor 150 may determine whether preparation of the second camera module 142 is completed. For example, in the case where the second camera module 142 operates at the first frame rate, the performance of the AE function, the AWB function, and the AF function are completed and ambient illumination is not less than marginal illumination, the processor 150 may determine that the second camera module 142 is available. According to an embodiment, the marginal illumination may be illumination in which a resolution or image quality of the second camera module 142 is respectively lower than a resolution or image quality of the first camera module 141 if the zoom ratio is not less than the first critical ratio and may be determined by an experiment. The marginal illumination may be differently set depending on each of a preview mode for video recording and a preview mode for capturing a still image. For example, the marginal illumination may be set to 80 lux at the preview mode of a video and may be set to 50 lux at the preview mode of the still image. In operation 235, additionally or alternatively, the processor 150 may determine whether the second camera module 142 is available, by using a distance from an object. For example, in the case where the distance from the object is shorter than a focusable distance of the second camera module 142 (e.g., 20 cm), the AF of the second camera module 142 may not be accurate. In addition, in the case where the distance from the object is short, a period of time to compose images obtained from two camera modules may increase. As such, only when the distance from the object is not less than a specified marginal distance, the processor 150 may determine that the second camera module 142 is available.

Operation 235 may be performed at least once after the zoom adjusting function is selected, and then operation 235 may be skipped.

In operation 235, if the processor 150 performs a preview by using an image from the second camera module 142, in operation 240, the processor 150 may output a preview image to the display 130 by using an image from the second camera module 142. In operation 240, the processor 150 may set up the frame rate of the second camera module 142 to the first frame rate and may set up the frame rate of the first camera module 141 to the second frame rate. For example, the second frame rate of the first camera module 141 may be 10 fps.

In operation 245, the processor 150 may determine whether the zoom adjusting function is ended. For example, the processor 150 may verify that the zoom adjusting function is ended, by verifying that a finger of a user performing the zoom adjusting function is released in a preview screen.

In operation 245, if verifying that the zoom adjusting function is ended, in operation 250, the processor 150 may direct the first and second camera modules 141 and 142 to perform the AF function. After operation 250, the processor 150 may change a mode or a frame rate of a camera module, which is not in charge of the preview, from among the first and second camera modules 141 and 142 into a sleep (or standby) mode or the second frame rate, respectively.

In operation 220, if the zoom adjusting function is not selected or after operation 250 is performed, in operation 255, the processor 150 may verify that the preview mode is ended. If the preview mode is ended, the processor 150 may direct the first and second camera modules 141 and 142 to be turned off. Until the preview mode is ended, the processor 150 may output the first image or second image provided from the first camera module 141 or the second camera module 142 as a preview image to the display 130.

If the processor 150 verifies that the zoom ratio is less than a first critical ratio in operation 230, or if the processor 150 verifies that the second camera module 142 is not prepared in operation 235, the processor 150 may output the preview image to the display 130 by using an image from the first camera module 141. If the processor 150 verifies that the zoom adjusting function is not ended in operation 245, in operation 230, the processor 150 may determine whether the zoom ratio is adjusted.

Figure 3:
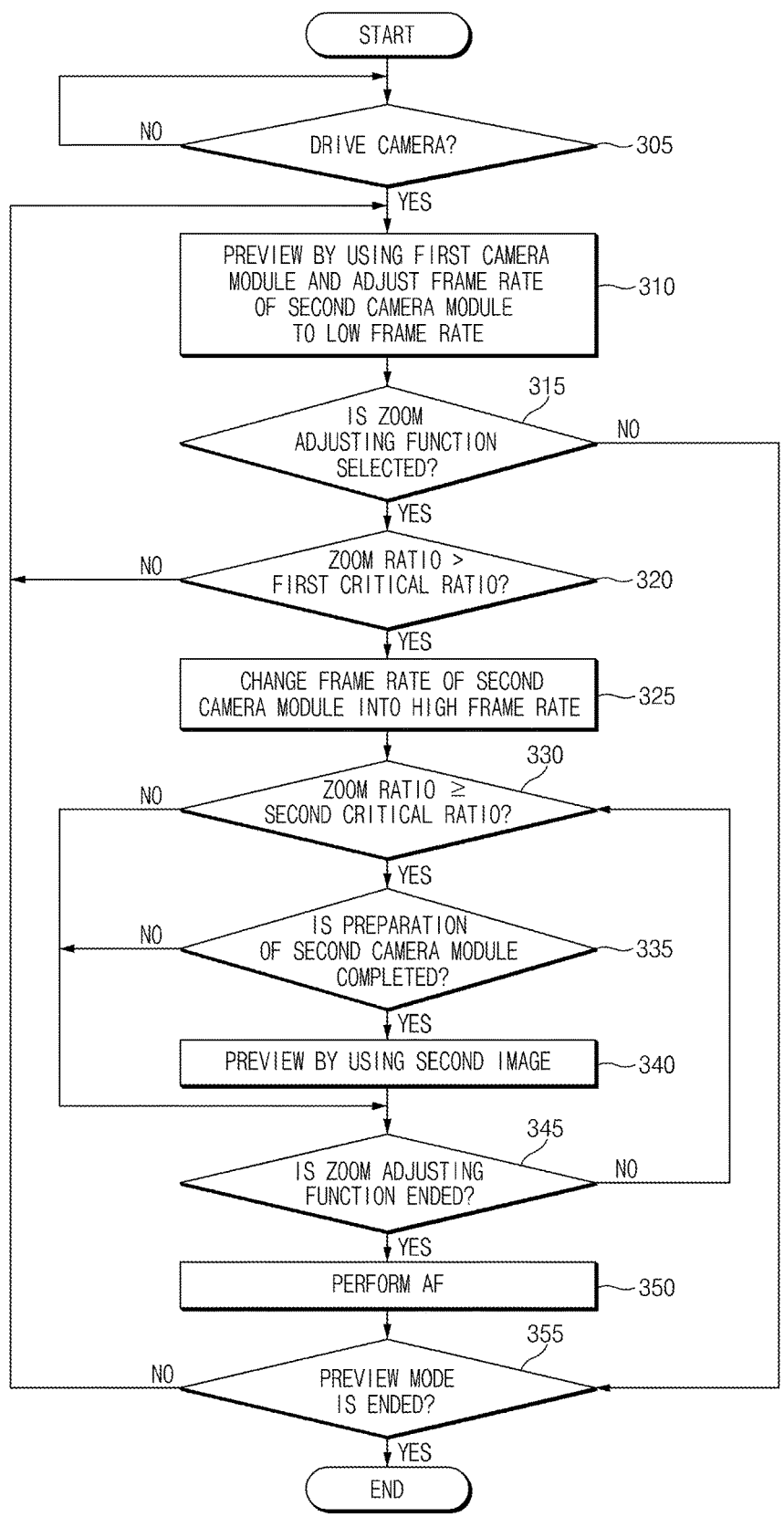
FIG. 3 is a flowchart illustrating a camera driving method, according to a second embodiment of the present disclosure.

FIG. 3 is a flowchart illustrating a camera driving method, according to a second embodiment of the present disclosure.

Referring to FIG. 3, the processor 150 sets up a frame rate of the second camera module 142 to a second frame rate instead of controlling the second camera module 142 to enter a sleep mode or a standby mode when driving a camera, or the processor 150 adjusts the frame rate of the second camera module 142 to a second frame rate when a zoom adjusting function is selected. When directing the slave to perform AF, the processor 150 may adjust the frame rate of the slave to the first frame rate, or may maintain the frame rate of the slave as the second frame rate. In the case of the former, the processor 150 may change the frame rate of the slave into the second frame rate again after performing the AF. According to an embodiment, the first frame rate may be the highest frame rate set in the preview mode, and the second frame rate may be less than the first frame rate.

In operation 305, the processor 150 may determine whether initialization of each of the first and second camera modules 141 and 142 is completed.

In operation 310, if the initialization of the first camera module 141 of the first and second camera modules 141 and 142 is completed, the processor 150 may output a preview image by using an image of the first camera module 141. The processor 150 may set up a frame rate of the first camera module 141 to the first frame rate. If the initialization of the second camera module 142 is completed, the processor 150 may set up the frame rate of the second camera module 142 to the second frame rate.

In operation 315, the processor 150 may determine whether a zoom adjusting function is selected by a user. For example, when verifying a two-finger touch on the preview screen, the processor 150 may verify selection of the zoom adjusting function.

In operation 320, if the zoom adjusting function is selected, the processor 150 may determine whether the zoom ratio adjusted through the input unit 160 is not less than a first critical ratio (e.g., 1.3 times). When AF of the second camera module 142 is not completed, or the AF fails before the zoom ratio is adjusted, the processor 150 may direct the second camera module 142 to perform the AF function. The first critical ratio at which a frame rate of a camera module to be changed is adjusted in advance before the camera module providing a preview image is changed may be, for example, 1.7 times.

If the processor 150 verifies that adjusted zoom ratio is not less than the first critical ratio in operation 320, in operation 325, the processor 150 may direct the second camera module 142 to change the frame rate of the second camera module 142 into the first frame rate. If the zoom adjusting function is selected regardless of the zoom ratio, the processor 150 may direct the second camera module 142 to change the frame rate of the second camera module 142 into the first frame rate.

In operation 330, the processor 150 may determine whether the zoom ratio is not less than a second critical ratio. The second critical ratio may be a ratio of a condition that a camera module, which provides a preview image and is a master, from among the first and second camera modules 141 and 142 is changed, and may be 2 times.

In operation 335, if the zoom ratio is not less than the second critical ratio, the processor 150 may determine whether preparation of the second camera module 142 is completed. For example, if a change of the frame rate of the second camera module 142 into the first frame rate is completed while the second camera module 142 completes AF, the processor 150 may determine that the preparation of the second camera module 142 is completed. If ambient illumination is less than marginal illumination even though the AF is completed and the change of the frame rate of the second camera module 142 into the first frame rate is completed, the processor 150 may determine that the preparation of the second camera module 142 is not completed. According to an embodiment, the marginal illumination may be illumination in which a resolution of the second camera module 142 is lower than a resolution of the first camera module 141 if the zoom ratio is not less than the first critical ratio and may be determined by an experiment. The marginal illumination may be differently set depending on each of a preview mode for video recording and a preview mode for capturing a still image. For example, the marginal illumination may be set to 80 lux at the preview mode of a video and may be set to 50 lux at the preview mode of the still image.

In operation 335, additionally or alternatively, the processor 150 may determine whether the second camera module 142 is available, by using a distance from an object. For example, in the case where the distance from the object is shorter than a focusable distance of the second camera module 142 (e.g., 20 cm), the AF of the second camera module 142 may not be accurate. In addition, in the case where the distance from the object is short, a period of time to compose images obtained from two camera modules may increase. As such, only when the distance from the object is not less than a specified marginal distance, the processor 150 may determine that the second camera module 142 is available. Operation 335 may be performed only the specific number of times (e.g., once) after the zoom adjusting function is selected, and then operation 335 may be skipped.

In operation 340, if the preparation of the second camera module 142 is completed, the processor 150 may perform a preview by using a second image from the second camera module 142.

In operation 345, the processor 150 may determine whether the zoom adjusting function is ended. For example, the processor 150 may verify that the zoom adjusting function is ended, by verifying that a finger of a user performing the zoom adjusting function is spaced apart from a preview screen.

If the zoom adjusting function is ended, in operation 350, the processor 150 may direct the first and second camera modules 141 and 142 to perform the AF function. After operation 350, the processor 150 may change a frame rate of a camera module, which is not in charge of the preview, from among the first and second camera modules 141 and 142 into the second frame rate.

In operation 315, if the zoom adjusting function is not selected or after operation 350 is performed, in operation 355, the processor 150 may verify that the preview mode is ended. If the preview mode is ended, the processor 150 may direct the first and second camera modules 141 and 142 to be turned off. Until the preview mode is ended, the processor 150 may output the first image or second image provided from the first camera module 141 or the second camera module 142 as a preview image to a display.

Figure 4:
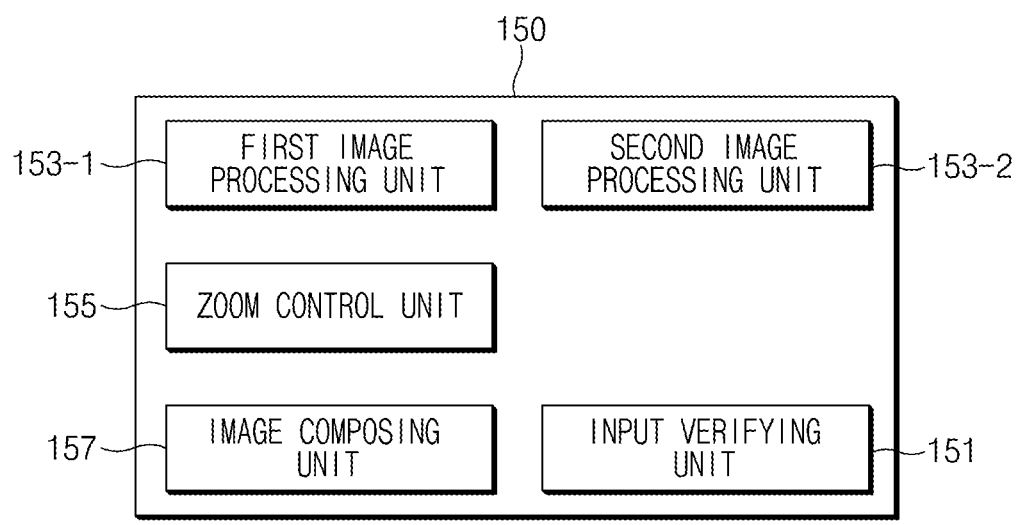
FIG. 4 is a block diagram illustrating a processor, according to an embodiment of the present disclosure.

FIG. 4 is a block diagram illustrating a processor, according to an embodiment of the present disclosure.

Referring to FIG. 4, the processor 150 may include an input verifying unit 151, a zoom control unit 155, first and second image processing units 153-1 and 153-2, and the image composing unit 157. Elements of the processor 150 may be a separate hardware module or may be a software module implemented by at least one processor. For example, the function of each of the elements included in the processor 150 may be performed by one processor or may be performed by each separate processor.

According to an embodiment of the present disclosure, the input verifying unit 151 may verify a still image/video capturing request, a capture request, a zoom adjustment request, or the like of a user. The input verifying unit 151 may detect a zoom ratio based on a user input. For example, in the case where an interface of the user input is a touch panel, the input verifying unit 151 may detect a zoom ratio set based on a spaced distance that increases compared with an initial spaced distance between two fingers.

According to an embodiment of the present disclosure, the zoom control unit 155 may control a driving mode of each of the first and second camera modules 141 and 142 depending on the zoom ratio detected by the input verifying unit 151. For example, the zoom control unit 155 may control the driving mode of each of the first and second camera modules 141 and 142 by directing the first and second camera modules 141 and 142 to change to an on mode, an off mode, or a sleep (or standby) mode. Before a zoom adjusting function is selected in a preview mode, the zoom control unit 155 may allow the second camera module 142 to enter a sleep mode or a standby mode. After the zoom adjusting function is selected in the preview mode, the zoom control unit 155 may allow the second camera module 142 to enter an active mode. According to an embodiment, the active mode may be a mode in which the second camera module 142 outputs the second image while being driven at the second frame rate.

According to an embodiment of the present disclosure, the zoom control unit 155 may control at least one of a frame rate, an AF function, an AE function, and an AWB function of each of the camera modules 141 and 142 based on the zoom ratio. For example, the zoom control unit 155 may adjust the frame rate of each of the camera modules 141 and 142 to the first frame rate or the second frame rate based on the zoom ratio. The zoom control unit 155 may change and set a frame rate of a master camera module (one of the camera modules 141 and 142) based on the sensed ambient illumination. For example, to synchronize with the master camera module (one of the camera modules 141 and 142) changed depending on illumination, the zoom control unit 155 may variably set a frame rate of a slave camera module (the other of the camera modules 141 and 142) while capturing.

According to an embodiment of the present disclosure, the zoom control unit 155 may direct the first and second image processing units 153-1 and 153-2 to perform AF, AE, and AWB depending on a preset scenario. For example, if the zoom adjusting function is selected through the input verifying unit 151 in the preview mode, the zoom control unit 155 may direct the first and second image processing units 153-1 and 153-2 to perform the AF, the AE, and the AWB. According to an embodiment of the present disclosure, the zoom control unit 155 may direct the image composing unit 157 to generate a preview image and a capture image.

According to an embodiment of the present disclosure, the first and second image processing units 153-1 and 153-2 may respectively perform 3A (AF, AWB, and AE) function on outputs of the first and second camera modules 141 and 142 and may respectively generate first and second images obtained after performing the 3A function. The first and second image processing units 153-1 and 153-2 may perform a task to tune image quality (color, brightness, focus, or the like) to be the same as each other on the outputs of the first and second camera modules 141 and 142, respectively. For example, one of the first and second image processing units 153-1 and 153-2 in a slave of the first and second camera modules 141 and 142 may receive AE and AWB information from the other of the first and second image processing units 153-1 and 153-2 in a master, and may perform the AE and the AWB based on the AE and the AWB of the master. When receiving an AF command, the first and second image processing units 153-1 and 153-2 may perform an AF function with respect to a center. According to an embodiment, the first and second image processing units 153-1 and 153-2 may be included in the camera modules 141 and 142 (e.g., image signal processing unit (ISP) of a camera), respectively.

According to an embodiment of the present disclosure, in the preview mode, the image composing unit 157 may generate a preview image by using an image from at least one of the first camera module 141 and the second camera module 142. For example, in the preview mode, the image composing unit 157 may generate the preview image corresponding to the zoom ratio by using an image from the first camera module 141 if the zoom ratio is less than the second critical ratio, and may generate the preview image corresponding to the zoom ratio by using an image from the second camera module 142 if the zoom ratio is not less than the second critical ratio.

According to an embodiment of the present disclosure, upon capture, the image composing unit 157 may generate a capture image by using an image from at least one of the first camera module 141 and the second camera module 142. For example, if the zoom ratio is less than the second critical ratio, the image composing unit 157 may generate the capture image by performing digital-zoom on an image of the first camera module 141 depending on the zoom ratio. If the zoom ratio is not less than the first critical ratio, the image composing unit 157 may generate the capture image by performing digital-zoom on an image of the second camera module 142 depending on the zoom ratio. If the zoom ratio is not less than the second critical ratio and is less than the first critical ratio, the image composing unit 157 may provide the capture image by composing images of the first and second camera modules 141 and 142.

According to an embodiment of the present disclosure, the image composing unit 157 may generate first and second images through image capture using the first and second camera modules 141 and 142, may crop the first and second images so as to correspond to the zoom ratio, and may compose the cropped two images. The image composing unit 157 may tilt and shift the second image based on the calibration value of the second camera module 142. The processor 150 may detect where a scene, which is to be used, of the second image is in the first image, by dividing the second image into a plurality of blocks. In addition, the processor 150 may compose the second image and the detected scene of the first image. In embodiments of the present disclosure, as the distance from the subject becomes shorter, parallax between the first and second camera modules 141 and 142 may be greater. As the distance from the subject becomes longer, the parallax between the first and second camera modules 141 and 142 may be smaller. The image composing unit 157 may detect a scene of the first image corresponding to the scene, which is to be used, of the second image to compose the first and second images every capturing process.

According to an embodiment, the calibration value may be determined through a calibration process when the first and second camera modules 141 and 142 are manufactured, and may be, for example, an intrinsic parameter or an extrinsic parameter. The intrinsic parameter may be a characteristic of each of camera modules, and may be an optical center, a focal length, lens distortion, or the like. The extrinsic parameter may indicate a relative location between two camera modules, and may be tilt or shift. The calibration value may be stored in an internal memory of each of the first and second camera modules 141 and 142 or one (e.g., ROM) of the first and second camera modules 141 and 142.

According to an embodiment of the present disclosure, the image composing unit 157 may adjust a composition ratio of the first and second images depending on the zoom ratio. For example, when the zoom ratio is 1.3 times, the image composing unit 157 may compose 70% of the first image and 30% of the second image. When the zoom ratio is 2 times, the image composing unit 157 may use only 100% of the second image. According to an embodiment, the composition ratio may be determined by an experiment.

According to various embodiments of the present disclosure, a preview image or a capture image may be generated by using at least one image of the first and second images from first and second camera modules being a plurality of unifocal cameras. As such, according to various embodiments of the present disclosure, a zoom function similar to an optical zoom function may be provided by a unifocal camera.

Figure 5:
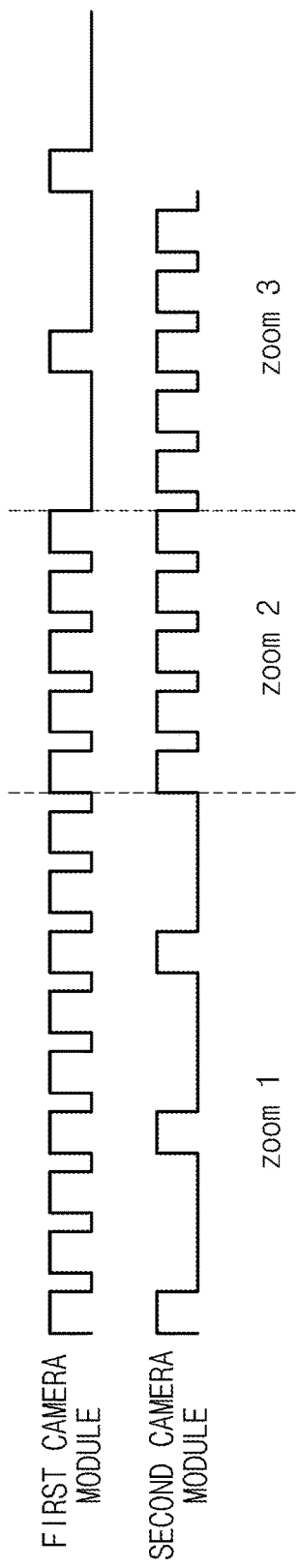
FIG. 5 is a timing diagram illustrating a frame rate, according to an embodiment of the present disclosure.

FIG. 5 is a timing diagram illustrating a frame rate, according to an embodiment of the present disclosure.

Referring to FIG. 5, if a zoom ratio satisfies a specified first condition zoom 1, the processor 150 may set up a frame rate of the first camera module 141 to a first frame rate (e.g., 30 fps) being the highest frame rate, and may set up a frame rate of the second camera module 142 to a second frame rate (e.g., 5 fps) being a low frame rate. Alternatively, if the zoom ratio satisfies a specified second condition zoom 2, the processor 150 may adjust each of the frame rates of the first and second camera modules 141 and 142 to the first frame rate. If the zoom ratio satisfies a specified third condition zoom 3, the processor 150 may adjust the frame rate of the first camera module 141 to the second frame rate and may adjust the frame rate of the second camera module 142 to the first frame rate.

Figure 6A:
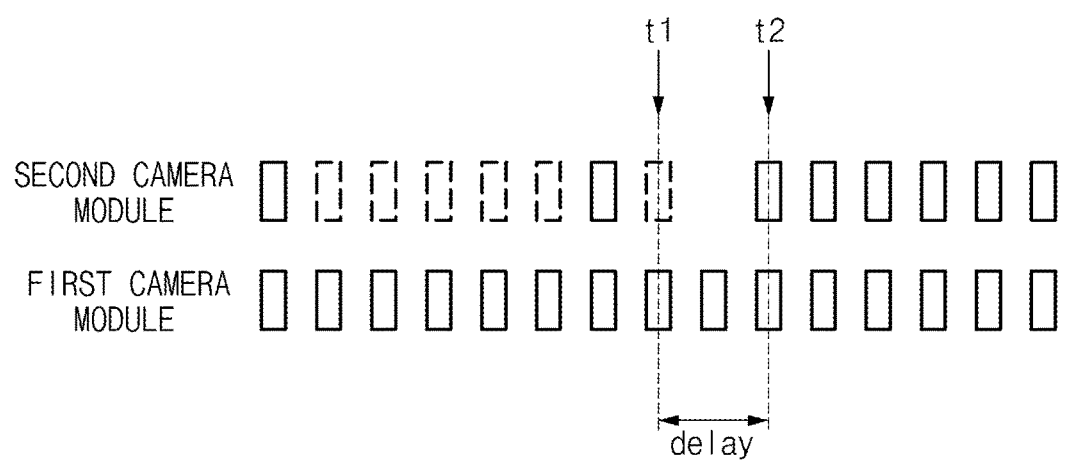
FIGS. 6A to 6C are timing diagrams for describing a frame rate controlling method, according to various embodiments of the present disclosure.
Figure 6B:
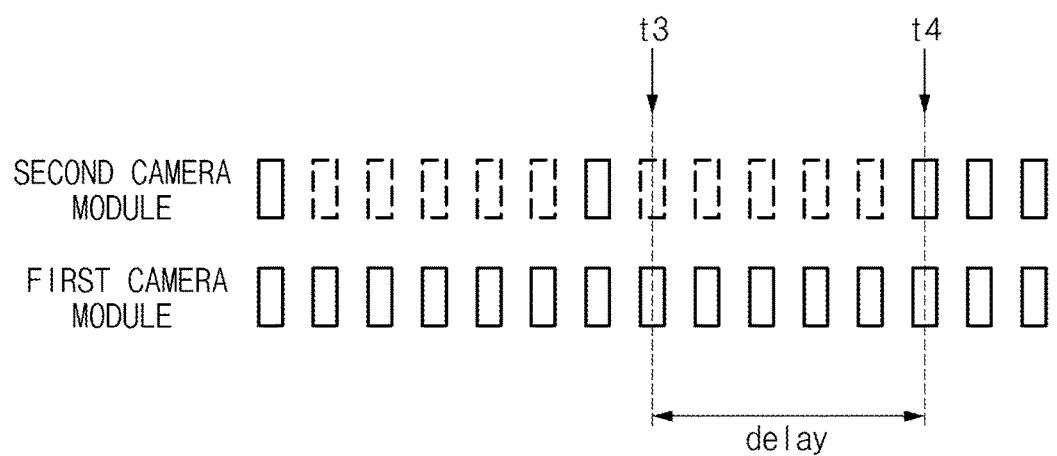
Figure 6C:
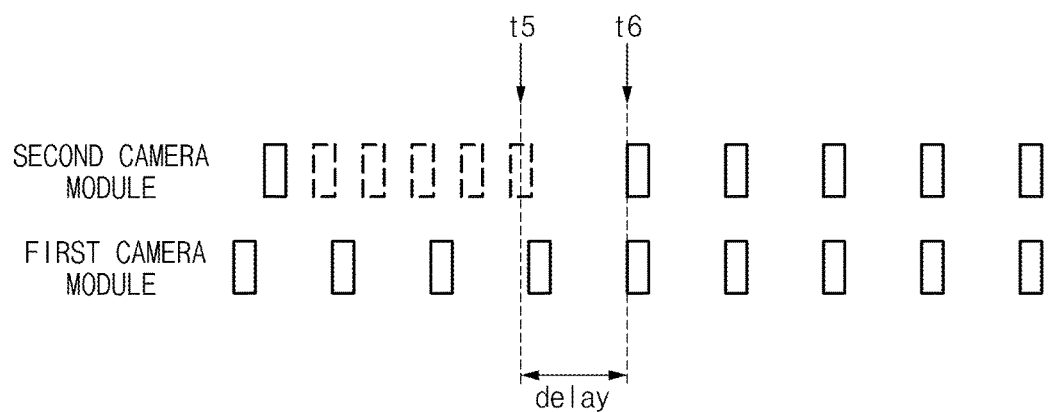

FIGS. 6A to 6C are timing diagrams for describing a frame rate controlling method, according to various embodiments of the present disclosure.

Referring to FIGS. 6A to 6C, a square of a solid line may be a section in which image frames are output by first and second camera modules, and a square of a dotted line may be a section in which image frame is not output by first or second camera module. FIGS. 6A and 6B are timing diagrams in the case where the first camera module 141 or the second camera module 142 outputs an image of the highest frame rate (30 fps), and FIG. 6C is a timing diagram in the case where an image output in a state where a frame rate of the first camera module 141 or the second camera module 142 is lower than the highest frame rate in a lower illumination. In this case, it is illustrated that the first camera module 141 and the second camera module 142 operate asynchronously (time async).

As illustrated in FIG. 6A, while driving the second camera module 142 at the second frame rate, the processor 150 may change the frame rate of the second camera module 142 through the following procedure. After directing the second camera module 142 to stream off at a time point t1, the processor 150 may change the frame rate of the second camera module 142 to the first frame rate, and then, the processor 150 may direct the second camera module 142 to stream on. The second camera module 142 may output the second image at the first frame rate after delay of t1 to t2. The delay 't2-t1' may be relatively short compared with the case where a frame rate is changed in a state where an image output of the second camera module 142 is maintained.

As illustrated in FIG. 6B, to change the frame rate of the second camera module 142 to the first frame rate while driving the second camera module 142 at the second frame rate, the processor 150 may direct the second camera module 142 to change the frame rate of the second camera module 142 into the first frame rate at a time point t3. In this case, the second camera module 142 may output the first image again at the first frame rate after delay of t3 to t4. The delay 't4-t3' may increase compared with delay 't2-t1' of FIG. 6A.

As illustrated in FIG. 6C, while asynchronously driving the second camera module 142 and the first camera module 141, the processor 150 may stream off an image of the second camera module 142 at a time point t5 to match synchronization. Afterwards, the processor 150 may change the frame rate of the second camera module 142 into the first frame rate, and then the processor 150 may stream on an image from the second camera module 142 in synchronization with the first camera module. A delay t5-t6 is illustrated in FIG. 6C.

Figure 7:
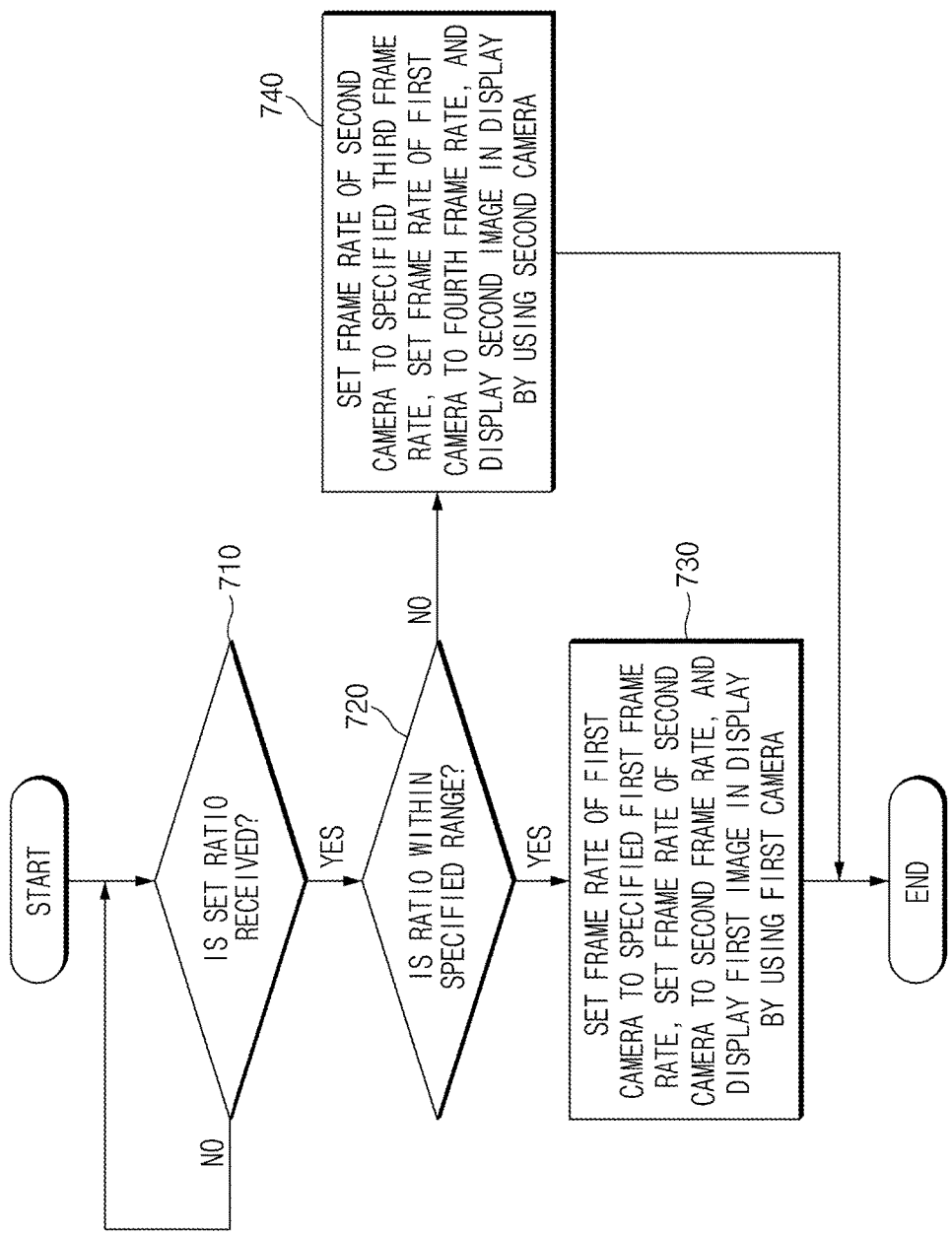
FIG. 7 is a flowchart illustrating an electronic apparatus controlling method, according to an embodiment of the present disclosure.

FIG. 7 is a flowchart illustrating an electronic apparatus controlling method, according to an embodiment of the present disclosure.

Referring to FIG. 7, in operation 710, a processor (e.g., the processor 150 of FIG. 1) may receive a ratio set through the input unit 160.

In operation 720, the processor 150 may determine whether the set ratio is within a specified range.

In operation 730, the processor 150 may set a frame rate of a first camera (e.g., the first camera module 141) to a specified first frame rate and may set a frame rate of a second camera to a second frame rate. The processor 150 may display a first image in a display (the display 130 of FIG. 1) by using the first camera.

In operation 740, the processor 150 may set the frame rate of the second camera (e.g., the second camera module 142) to a specified third frame rate and may set the frame rate of the first camera to a fourth frame rate. The processor 150 may display a second image in the display by using the second camera.

Figure 8:
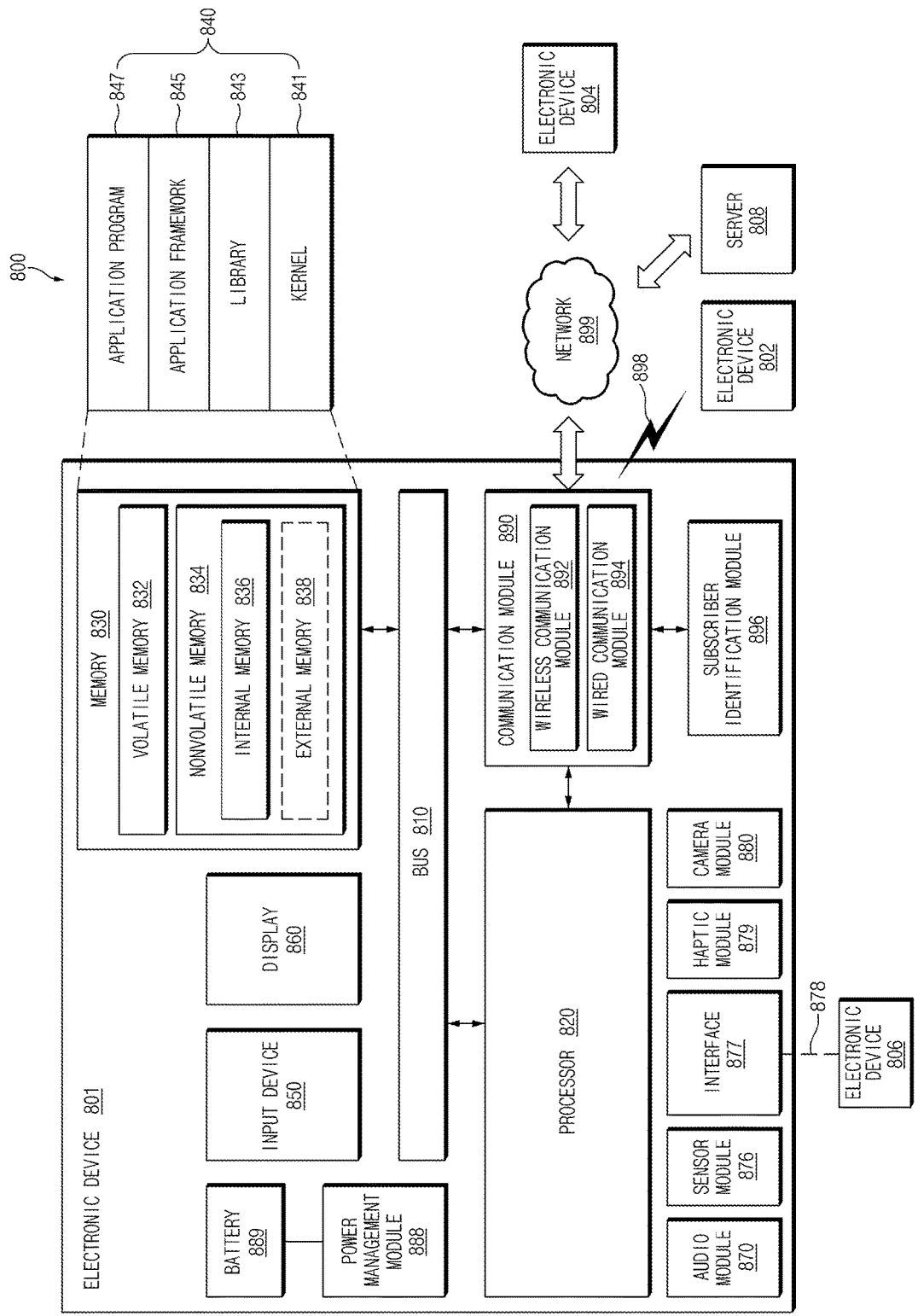
FIG. 8 is a block diagram of an electronic device in a network environment according to various embodiments of the present disclosure.

FIG. 8 illustrates an electronic device 801 in a network environment 800, according to various embodiments of the present disclosure.

Referring to FIG. 8, the electronic device 801 may include various types of devices. For example, the electronic device 801 may include at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an Motion Picture Experts Group (MPEG-1 or MPEG-2) Audio Layer 3 (MP3) player), a portable medical device (e.g., a heart rate, blood glucose, blood pressure, or a thermometer, a camera, or a wearable device. A wearable device may include at least one of an accessory type of a device (e.g., a timepiece, a ring, a bracelet, an anklet, a necklace, glasses, a contact lens, or a head-mounted device (FIN/ID)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audios, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may complexly provide functions of multiple devices. In the present disclosure, the term "user" used herein may refer to a person who uses the electronic device or may refer to a device (e.g., an artificial intelligence electronic device) that uses the electronic device.

Referring to FIG. 8, under the network environment 800, the electronic device 801 (e.g., an electronic device) may communicate with an electronic device 802 through local wireless communication 898 or may communication with an electronic device 804 or a server 808 through a network 899. According an embodiment, the electronic device 801 may communicate with the electronic device 804 through the server 808.

According to an embodiment, the electronic device 801 may include a bus 810, a processor 820 (e.g., at least one processor) a memory 830, an input device 850 (e.g., a micro-phone or a mouse), a display 860, an audio module 870, a sensor module 876, an interface 877, a haptic module 879, a camera module 880, a power management module 888, a battery 889, a communication module 890, and a subscriber identification module 896. According to an embodiment, the electronic device 801 may not include at least one (e.g., the display 860 or the camera module 880) of the above-described elements or may further include other element(s).

For example, the bus 810 may interconnect the above-described elements 820 to 890 and may include a circuit for conveying signals (e.g., a control message or data) between the above-described elements. The processor 820 may include one or more of a central processing unit (CPU), an application processor (application), a graphic processing unit (GPU), a camera image signal processor (ISP) of a camera or a communication processor (CP). According to an embodiment, the processor 820 may be implemented with a system on chip (Soc) or a system in package (SiP). For example, the processor 820 may drive an operating system (OS) or an application to control at least one of another element (e.g., hardware or software element) connected to the processor 820 and may process and compute various data. The processor 820 may load an instruction or data, which is received from at least one of other elements (e.g., the communication module 890), into a nonvolatile memory 832 to process the instruction or data and may store the process result data into the nonvolatile memory 834.

The memory 830 may include, for example, a volatile memory 832 or a nonvolatile memory 834. The volatile memory 832 may include, for example, a random access memory (RAM) (e.g., a dynamic random access memory (DRAM), a static RAM (SRAM), or a synchronous dynamic RAM (SDRAM)). The nonvolatile memory 834 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 834 may be configured in the form of an internal memory 836 or the form of an external memory 838 which is available through connection only if necessary, according to the connection forms of the electronic device 801. The external memory 838 may further include a flash drive such as compact flash (CF), secure digital (SD), micro secure digital (micro-SD), mini secure digital (mini-SD), extreme digital (xD), a multimedia card (MMC), or a memory stick. The external memory 838 may be operatively or physically connected with the electronic device 801 in a wired manner (e.g., a cable or a universal serial bus (USB)) or a wireless (e.g., Bluetooth (BT)) manner.

For example, the memory 830 may store, for example, at least one different software element, such as an instruction or data associated with the program 840, of the electronic device 801. The program 840 may include, for example, a kernel 841, a library 843, an application framework 845 or an application program (interchangeably, "application") 847.

The input device 850 may include a microphone, a mouse, or a keyboard. According to an embodiment, the keyboard may include a keyboard physically connected or a keyboard virtually displayed through the display 860.

The display 860 may include a display, a hologram device or a projector, and a control circuit to control a relevant device. The screen may include, for example, a liquid crystal display (LCD), a light emitting diode (LED) display, an organic LED (OLED) display, a plastic OLED (POLED), a microelectromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 801.

The audio module 870 may convert, for example, from a sound into an electrical signal or from an electrical signal into the sound. According to an embodiment, the audio module 870 may acquire sound through the input device 850 (e.g., a microphone) or may output sound through an output device (not illustrated) (e.g., a speaker or a receiver) included in the electronic device 801, an external electronic device (e.g., the electronic device 802 (e.g., a wireless speaker or a wireless headphone)) or an electronic device 806 (e.g., a wired speaker or a wired headphone) connected with the electronic device 801.

The sensor module 876 may measure or detect, for example, an internal operating state (e.g., power or temperature) or an external environment state (e.g., an altitude, a humidity, or brightness) of the electronic device 801 to generate an electrical signal or a data value corresponding to the information of the measured state or the detected state. The sensor module 876 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 876 may further include a control circuit for controlling at least one or more sensors included therein. According to an embodiment, the sensor module 876 may be controlled by using the processor 820 or a processor (e.g., a sensor hub) separate from the processor 820. In the case that the separate processor (e.g., a sensor hub) is used, while the processor 820 is a sleep state, the separate processor may operate without awakening the processor 820 to control at least a portion of the operation or the state of the sensor module 876.

According to an embodiment, the interface 877 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 878 may physically connect the electronic device 801 and the electronic device 806. According to an embodiment, the connector 878 may include, for example, an USB connector, an SD card/MMC connector, or an audio connector (e.g., a headphone connector).

The haptic module 879 may convert an electrical signal into mechanical stimulation (e.g., vibration or motion) or into electrical stimulation. For example, the haptic module 879 may apply tactile or kinesthetic stimulation to a user. The haptic module 879 may include, for example, a motor, a piezoelectric element, or an electric stimulator.

The camera module 880 may capture, for example, a still image and a moving picture. According to an embodiment, the camera module 880 may include at least one lens (e.g., a wide-angle lens and a telephoto lens, or a front lens and a rear lens), an image sensor, an image signal processor (ISP), or a flash (e.g., a light emitting diode or a xenon lamp).

The power management module 888, which is to manage the power of the electronic device 801, may constitute at least a portion of a power management integrated circuit (PMIC).

The battery 889 may include a primary cell, a secondary cell, or a fuel cell and may be recharged by an external power source to supply power at least one element of the electronic device 801.

The communication module 890 may establish a communication channel between the electronic device 801 and an external device (e.g., the first external electronic device 802, the second external electronic device 804, or the server 808). The communication module 890 may support wired communication or wireless communication through the established communication channel. According to an embodiment, the communication module 890 may include a wireless communication module 892 or a wired communication module 894. The communication module 890 may communicate with the external device (e.g., the first external electronic device 802, the second external electronic device 804 or the server 808) through a first network 898 (e.g. a wireless local area network (LAN) such as Bluetooth (BT) or infrared data association (IrDA)) or a second network 899 (e.g., a wireless wide area network such as a cellular network) through a relevant module among the wireless communication module 892 or the wired communication module 894.

The wireless communication module 892 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, BT, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the present disclosure, "GPS" and "GNSS" may be interchangeably used.

According to an embodiment, when the wireless communication module 892 supports cellar communication, the wireless communication module 892 may, for example, identify or authenticate the electronic device 801 within a communication network using the subscriber identification module (e.g., a subscriber identity module (SIM) card) 896. According to an embodiment, the wireless communication module 892 may include the processor 820 (e.g., an application processor (AP) and a separate communication processor (CP). In this case, the CP may perform at least a portion of functions associated with at least one of elements 810 to 896 of the electronic device 801 in substitute for the processor 820 when the processor 820 is in an inactive (sleep) state, and together with the processor 820 when the processor 820 is in an active state. According to an embodiment, the wireless communication module 892 may include a plurality of communication modules, each supporting only a relevant communication scheme among cellular communication, short-range wireless communication, or a GNSS communication scheme.

The wired communication module 894 may include, for example, include a local area network (LAN) service, a power line communication, or a plain old telephone service (POTS).

For example, the first network 898 may employ, for example, WiFi direct or Bluetooth (BT) for transmitting or receiving instructions or data through wireless direct connection between the electronic device 801 and the first external electronic device 802. The second network 899 may include a telecommunication network (e.g., a computer network such as a LAN or a wide area network (WAN), the Internet or a telephone network) for transmitting or receiving instructions or data between the electronic device 801 and the second electronic device 804.

According to embodiments, the instructions or the data may be transmitted or received between the electronic device 801 and the second external electronic device 804 through the server 808 connected with the second network. Each of the external first and second external electronic devices 802 and 804 may be a device of which the type is different from or the same as that of the electronic device 801. According to various embodiments, all or a part of operations that the electronic device (801 will perform may be executed by another or a plurality of electronic devices (e.g., the electronic devices 802 and 804 or the server 808. According to an embodiment, in the case that the electronic device 801 executes any function or service automatically or in response to a request, the electronic device 801 may not perform the function or the service internally, but may alternatively or additionally transmit requests for at least a part of a function associated with the electronic device 801 to another device (e.g., the electronic device 802 or 804 or the server 808). The other electronic device (e.g., the electronic device 802 or 804 or the server 808) may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the other element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device (e.g. 830).

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 820, may cause the one or more processors to perform a function corresponding to the instruction. The computer-readable storage media, for example, may be the memory 830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

According to an embodiment of the present disclosure, power consumed by a camera may be reduced in a system using a dual camera.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a first camera including a first angle of view;
a second camera including a second angle of view;
a display;
an input device configured to obtain a ratio that is set based on a user input; and
at least one processor, wherein, when the ratio is within a first specified range, the at least one processor is configured to set the first camera to a first frame rate, set the second camera to a second frame rate, which is slower than the first frame rate, and control the display to display a first image, which is obtained at the first frame rate by using the first camera,
wherein, when the ratio is within a second specified range, the at least one processor is further configured to set the second camera to a third frame rate, set the first camera to a fourth frame rate, which is slower than the third frame rate, and control the display to display a second image, which is obtained at the third frame rate by using the second camera, and
wherein the at least one processor is further configured to:
control the second camera to enter a sleep mode or a standby mode before the ratio is adjusted through the input device, and
when the ratio is adjusted, control the second camera to wake up.

2. The electronic apparatus of claim 1, wherein the at least one processor is further configured to:
when the ratio is within the first specified range, obtain the second image at the second frame rate by using the second camera, and
when the ratio is within the second specified range, obtain the first image at the fourth frame rate by using the first camera.

3. The electronic apparatus of claim 1, wherein the first frame rate comprises a same frame rate as the third frame rate.

4. The electronic apparatus of claim 1, wherein the second frame rate comprises a same frame rate as the fourth frame rate.

5. The electronic apparatus of claim 1,
wherein the first frame rate and the second frame rate are in multiple relation, and
wherein the third frame rate and the fourth frame rate are in multiple relation.

6. The electronic apparatus of claim 5, wherein the at least one processor is further configured to:
set a frame rate of the first camera by multiples of a frame rate of the second camera, to synchronize the first camera and the second camera with each other.

7. The electronic apparatus of claim 1, wherein the at least one processor is further configured to:
when the first frame rate or the third frame rate is variably set depending on sensed ambient illumination, variably set the second frame rate or the fourth frame rate to a specified rate depending on the sensed ambient illumination such that the first frame rate is synchronized with the second frame rate or the third frame rate is synchronized with the fourth frame rate.

8. The electronic apparatus of claim 7, wherein, when a capture command is received through the input device in a state where the first frame rate of the first camera is variably set depending on the sensed ambient illumination, multiple relation is not maintained, and the first camera and the second camera operate asynchronously, the at least one processor is further configured to:
interrupt a frame of the second camera, and
newly start the frame of the second camera in synchronization with a frame of the first camera such that the frame of the second camera is synchronized with the frame of the first camera.

9. The electronic apparatus of claim 1, wherein the at least one processor is further configured to:
when the ratio is within the second specified range, determine whether the second camera completed auto exposure (AE), auto white balance (AWB), and auto focus (AF), and changed a frame rate of the second camera into the first frame rate, before controlling the display to display the second image.

10. The electronic apparatus of claim 9, wherein the at least one processor is further configured to:
when the ratio is within the second specified range and the ambient illumination is less than marginal illumination, control the display to display the first image, which is obtained at the first frame rate or at a frame rate adjusted depending on ambient illumination by using the first camera.

11. The electronic apparatus of claim 9, wherein the at least one processor is further configured to:
when the ratio is within the second specified range, the second camera does not complete the AF, and the frame rate of the second camera is not changed to the first frame rate, control the display to display the first image, which is obtained at the first frame rate or at a frame rate adjusted depending on ambient illumination by using the first camera.

12. The electronic apparatus of claim 1, wherein the at least one processor is further configured to:
when a range of the ratio is changed from the second specified range to the first specified range by a zoom-out operation, set a frame rate of the first camera to the first frame rate,
control the display to display a first image, which is obtained at the fourth frame rate, before the frame rate of the first camera is changed, and
control the display to display the first image, which is obtained at the first frame rate, after the frame rate of the first camera is changed to the first frame rate.

13. The electronic apparatus of claim 1, wherein the at least one processor is further configured to:

when a capture command is received through the input device, perform a digital-zoom on the first image or the second image depending on the ratio, or after cropping the first image and the second image depending on the ratio, utilize the cropped first image and the cropped second image to generate a capture image corresponding to the ratio.

14. The electronic apparatus of claim 1, wherein the first camera is a master providing an image to be output to the display and the second camera is a slave, or vice versa, and wherein the at least one processor is further configured to perform auto exposure (AE) and auto white balance (AWB) of the slave based on AE information and AWB information of the master.

15. The electronic apparatus of claim 1, wherein the at least one processor is further configured to:

when the ratio is adjusted to be decreased through the input device after being increased and when the ratio is one, control the second camera to enter a sleep mode or a standby mode.

16. The electronic apparatus of claim 1, wherein the second angle of view is less than the first angle of view, and wherein the at least one processor is further configured to:

when a capture command is received through the input device while controlling the display to display the second image, which is obtained from the second camera, generate a depth map in an image scene of the second camera by using the first and second cameras.

17. A method of controlling, by at least one processor, an electronic apparatus including a first camera having a first angle of view and a second camera having a second angle of view, the method comprising:

receiving a ratio, which is set by user intention, through an input device;

when the ratio is within a first specified range, setting the first camera to a first frame rate, setting the second camera to a second frame rate, which is slower than the first frame rate, controlling the second camera in a sleep mode or a standby mode, and displaying a first image, which is obtained at the first frame rate by using the first camera, through a display; and when the ratio is within a second specified range, controlling the second camera to wake up in response to an adjustment of the ratio, setting the second camera to a third frame rate, setting the first camera to a fourth frame rate, which is slower than the third frame rate, and displaying a second image, which is obtained at the third frame rate by using the second camera, through the display.

18. The method of claim 17, further comprising:

when the ratio is within the first specified range, obtaining the second image at the second frame rate by using the second camera; and when the ratio is within the second specified range, obtaining the first image at the fourth frame rate by using the first camera.

19. The method of claim 17, wherein the displaying of the second image through the display includes:

determining whether the second camera completed autofocus (AF) and changed a frame rate of the second camera into the third frame rate;

when it is determined that the second camera completed AF and changed the frame rate of the second camera into the third frame rate, displaying the second image, which is obtained at the third frame rate by using the second camera, through the display; and when it is determined that the second camera has not completed AF or changed the frame rate of the second camera into the third frame rate, displaying the first image, which is obtained at the fourth frame rate by using the first camera, through the display.

* * * * *